US011321302B2

(12) United States Patent
Hanai et al.

(10) Patent No.: US 11,321,302 B2
(45) Date of Patent: May 3, 2022

(54) COMPUTER SYSTEM AND DATABASE MANAGEMENT METHOD

(71) Applicant: Hitachi, Ltd., Tokyo (JP)

(72) Inventors: Tomohiro Hanai, Tokyo (JP); Norifumi Nishikawa, Tokyo (JP); Akira Shimizu, Tokyo (JP); Kazuhiko Mogi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 147 days.

(21) Appl. No.: 15/559,175

(22) PCT Filed: Jul. 17, 2015

(86) PCT No.: PCT/JP2015/070503
§ 371 (c)(1),
(2) Date: Sep. 18, 2017

(87) PCT Pub. No.: WO2017/013701
PCT Pub. Date: Jan. 26, 2017

(65) Prior Publication Data
US 2018/0075080 A1    Mar. 15, 2018

(51) Int. Cl.
*G06F 16/23* (2019.01)
*G06F 9/48* (2006.01)
(Continued)

(52) U.S. Cl.
CPC ........ *G06F 16/2358* (2019.01); *G06F 9/4881* (2013.01); *G06F 9/5016* (2013.01); *G06F 16/2246* (2019.01); *G06F 16/2282* (2019.01)

(58) Field of Classification Search
CPC ............. G06F 16/2358; G06F 16/2282; G06F 16/2246; G06F 9/4881; G06F 9/5016;
(Continued)

(56) References Cited

U.S. PATENT DOCUMENTS 6,026,406 A * 2/2000 Huang ................ G06F 16/2343
8,825,652 B1   9/2014 Faibish et al.
(Continued)

FOREIGN PATENT DOCUMENTS

JP    5-181721 A      7/1993
JP    2009-245047 A   10/2009
WO    WO 2013/161076 A1   10/2013

OTHER PUBLICATIONS

International Search Report (PCT/ISA/210) issued in PCT Application No. PCT/JP2015/070503 dated Oct. 6, 2015 with English translation (Two (2) pages).
(Continued)

*Primary Examiner* — Robert W Beausoliel, Jr.
*Assistant Examiner* — Mohammad Solaiman Bhuyan
(74) *Attorney, Agent, or Firm* — Crowell & Moring LLP

(57) ABSTRACT

A computer system according to the present invention has a plurality of processor cores that execute a plurality of threads in a parallel manner. When one of the threads updates a database (DB) region that is among a plurality of database regions associated with a database (DB), and that cannot be updated by more than one thread, the computer system selects one of one or more dedicated log buffers as a log buffer to which a log relating to the update of the database region is to be written. In contrast, when one of the threads updates a database region that is among the plurality of database regions, and that can be updated by more than one thread, the computer system selects one of one or more shared log buffers as a log buffer to which a log relating to the update of the database region is to be written. Each dedicated log buffer is a log buffer that can store one or more logs associated with only one thread and that cannot store two or more logs associate with two or more threads. Each
(Continued)

shared log buffer is a log buffer that can store two or more logs associated with two or more threads.

15 Claims, 8 Drawing Sheets

(51) Int. Cl.
    *G06F 9/50*     (2006.01)
    *G06F 16/22*     (2019.01)
    *G06F 11/14*     (2006.01)

(58) Field of Classification Search
    CPC .. G06F 12/00; G06F 11/1471; G06F 16/2336; G06F 16/2308; G06F 16/2379
    See application file for complete search history.

(56) References Cited

U.S. PATENT DOCUMENTS

| | | | |
|---|---|---|---|
| 9,183,200 B1* | 11/2015 | Liu | G06F 16/278 |
| 9,529,568 B1* | 12/2016 | Karppanen | G06F 5/14 |
| 9,613,120 B1* | 4/2017 | Kharatishvili | G06F 16/23 |
| 2003/0061537 A1* | 3/2003 | Cha | G06F 11/1471 714/16 |
| 2004/0010499 A1* | 1/2004 | Ghosh | G06F 16/2358 |
| 2004/0260726 A1* | 12/2004 | Hrle | G06F 11/1466 |
| 2009/0235262 A1* | 9/2009 | Ceze | G06F 9/52 718/102 |
| 2009/0240664 A1* | 9/2009 | Dinker | G06F 12/0842 |
| 2009/0248922 A1 | 10/2009 | Hinohara et al. | |
| 2010/0250504 A1* | 9/2010 | Balasubramanian | G06F 16/217 707/696 |
| 2012/0084260 A1* | 4/2012 | Cherkauer | G06F 11/2094 707/648 |
| 2012/0254887 A1* | 10/2012 | Rodriguez | G06F 16/24526 718/106 |
| 2015/0112967 A1 | 4/2015 | Shimizu et al. | |
| 2015/0254264 A1* | 9/2015 | Yu | G06F 16/137 707/674 |
| 2016/0085639 A1* | 3/2016 | Abouzour | G06F 11/1471 707/648 |

OTHER PUBLICATIONS

Japanese-language Written Opinion (PCT/ISA/237) issued in PCT Application No. PCT/JP2015/070503 dated Oct. 6, 2015 (Three (3) pages).

* cited by examiner

Comparative example

FIG. 6

Buffer page management table
461

| Buffer page number 601 | | 1 | 2 | 3 | 4 | ... |
|---|---|---|---|---|---|---|
| Status 602 | | Dirty | Dirty | Clean | Dirty | ... |
| DB page number 603 | | 100 | 101 | 200 | 250 | ... |
| Data type 604 | | Data page | Data page | Index upper page | Index leaf page | ... |
| Storage state 605 | PLB 01 | Y | N | N | Y | ... |
| | SLB 01 | Y | N | N | Y | |
| | PLB 02 | N | Y | N | Y | ... |
| | SLB 02 | N | Y | N | Y | |
| | PLB 03 | N | N | N | N | ... |
| | SLB 03 | N | N | N | N | |
| | PLB 04 | N | N | N | N | ... |
| | SLB 04 | N | N | N | N | |

COMPUTER SYSTEM AND DATABASE MANAGEMENT METHOD

TECHNICAL FIELD

The present invention relates generally to database management techniques.

BACKGROUND ART

Generally, it is necessary to output a data operation log when data operations (such as updates) are performed in a database (DB).

It is desirable for data logs to be output at high speed. For instance, in order to analyze data generated at a high rate (for example, sensor data from control systems) at a high speed, it is necessary to store the data in tables of the DB at a high throughput. Upon storing data in the DB, the index used for data search is also updated. In this case, both the data log (a log of data operations with respect to DB tables) and an index log (a log of data operations with respect to the index) are output. It is desirable for both the data log and the index log to be output at a high speed.

PTL 1 discloses a technique for combining a plurality of small files into one file and performing offset management.

CITATION LIST

Patent Literature

[PTL 1] U.S. Pat. No. 8,825,652

SUMMARY OF INVENTION

Technical Problem

Generally, computer system such as a DB server includes a plurality of processor cores (hereinafter referred to as cores), and each core may execute a thread. Multiple cores can execute multiple threads in a parallel fashion.

In order to avoid processing conflicts (e.g., conflicts when parallel log outputs), it is possible to logically divide at least a part of the computer system that executes parallel processing.

Accordingly, as designated in FIG. 1, environments having multiple log buffers for log parallel output are considered. This allows multiple threads to store multiple logs in a plurality of log buffers in a parallel fashion (log buffers may or may not be allocated to threads). In such an environment, the following premises may be adopted.

One or more log files may exist for each log buffer. The log files may be stored on an external storage device with the DB server, or may exist in the memory inside of the DB server.

There may be a plurality of DB regions and a plurality of log regions. The plurality of DB regions may include a plurality of data regions and a plurality of index regions. Both regions may be logical regions. The data in the data region is data to be written to a DB table, the data in the index region is data to be written to the index, and the logs in the log region are data to be written to a log file. At least the data region and the index region may include a collection of one or more pages. Herein, it is assumed that both the data region and the index region are one page. As such, the data region is herein referred to as a "data page" and the index region is herein referred to as an "index page."

Further, herein the data page and the index page may be collectively referred to as a "DB page." The DB page may be an example of the DB region. Additionally, it is assumed that the log region is a log file.

DB page updates may include both logical updates and physical updates. Logical updates may refer to writing data from the DB page to a data buffer. Physical updates may refer to page writing. Page writing may refer to actually writing data stored in a data buffer (in particular, dirty data which is data that has not yet been actually written to a DB page) to a DB page. The page writing may be performed on an individual page-by-page basis.

As designated in FIG. 1, in such an environment, it is anticipated that the number of writing index log from the log buffer to the log file will become large. The reasons are described below.

When one or more data pages are updated, one or more index pages are also updated by a plurality of threads. This is because updating of the index is also necessary when the DB table is updated.

In some cases, a plurality of index logs may be written to a plurality of log buffers for a single index page. This is because there are cases where index pages to be updated by updating a plurality of data pages may be shared.

Prior to the page of the index page being written, the index log related to that index page may be written to a log file (Write Ahead Logging, or WAL). This is because, when an error occurs before completion of commit processing, a rollback may be performed after system restart by using logs to restore data to the state before page writing occurred.

As a result, the degree of parallelism of the index log output may decrease. This is because, as designated in FIG. 1, when one index page is written to, a plurality of index logs related to the index page are written in a plurality of log files by a thread, but the logbuffer inwhich the log file is stored may encounter exclusivity (lock) delays (that is, new writes to the log buffer are postponed) during the time in which the index log is being written to the log file.

Additionally, when the frequency of writing from the log buffer to the log file is high, logs may be written to the log buffer before logs (entries) are sufficiently loaded in each of the plurality of log buffers. As such, the number of writes to the log file becomes large.

Problems such as these are not limited to index logs, but may also occur with respect to data logs.

It is not possible to simply make use of the technique disclosed in PTL 1 to combine a plurality of smaller files into a single file in order to solve the problem that the number of log writes from the buffer is large. Even where the technique of PTL 1 to be utilized, it would not be possible to solve the present problem. Discussion of writing logs to and from the buffer is entirely absent from PTL 1.

Solution to Problem

In computer systems having a plurality of processor cores configured to execute a plurality of threads in parallel, one or more dedicated log buffers and one or more shared log buffers may be prepared as log buffers. With respect to a thread that updates a DB region that cannot be updated by two or more threads of the plurality of DB regions corresponding to the database (DB), the computer system may select any of the dedicated log buffers as a log buffer to which a log relating to an update of the DB region is to be written. With respect to a thread that updates a DB region that can be updated by two or more threads of the plurality of DB regions, the computer system may select any of the shared log buffers as a log buffer to which a log relating to an update of the DB region is to be written. Each dedicated log buffer is a log buffer that can store one or more logs associated with one thread, but that cannot store two or more logs associated with two or more threads. Each shared log buffer is a log buffer that can store two or more logs for two or more threads.

Advantageous Effects of Invention

The number of writes from the log buffer to the log region (e.g., log file) may be reduced.

BRIEF DESCRIPTION OF DRAWINGS

FIG. 6 is an example configuration of a buffer page management table.

DESCRIPTION OF EMBODIMENTS

Figure 1:
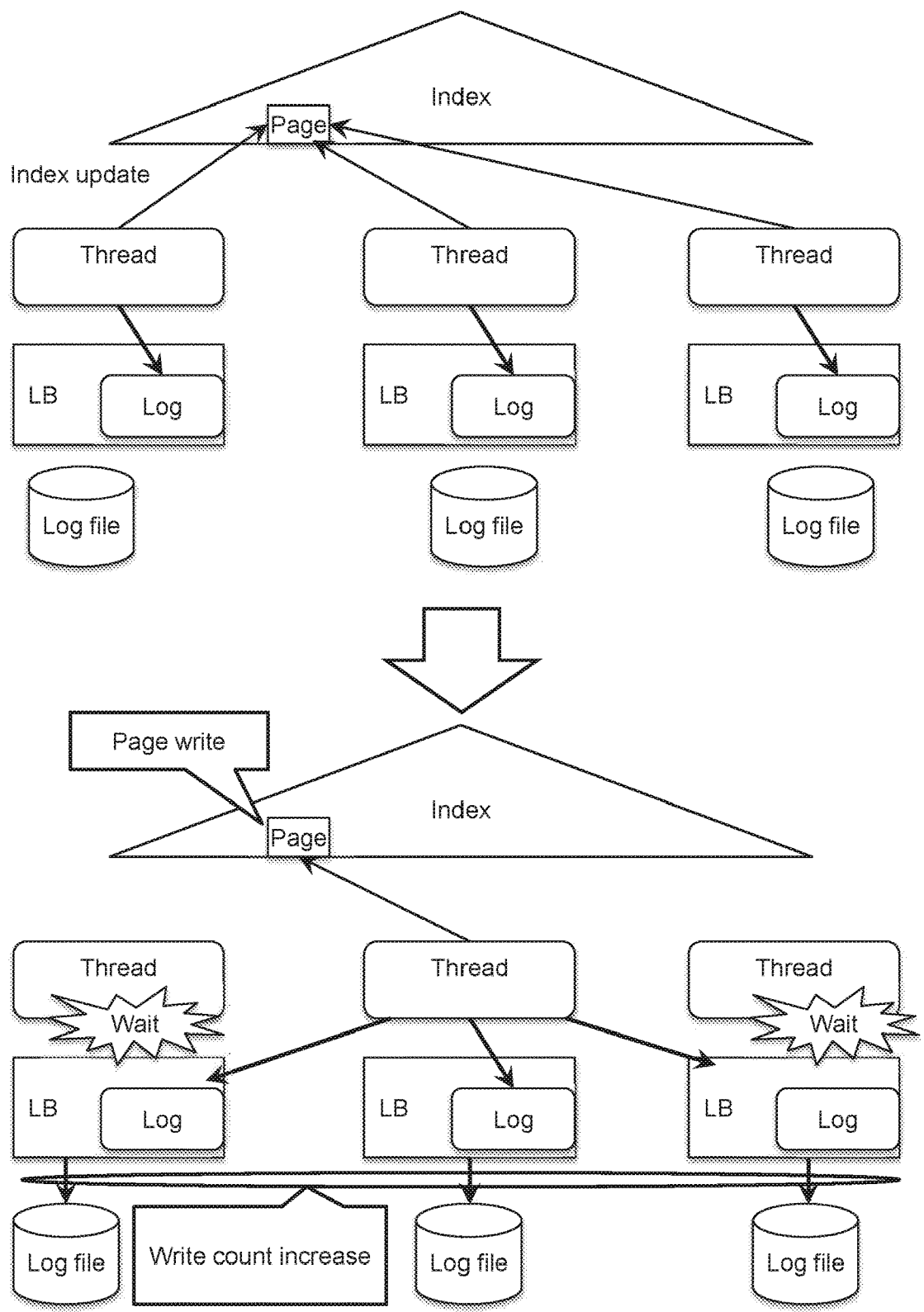
FIG. 1 is an explanatory diagram of a comparative example.

Hereinafter, an embodiment will be described with reference to the figures.

In the following description, an issuer of a query to the database management system (hereinafter DBMS) may be an internal computer program of the DBMS, or a computer program external to the DBMS (for example, a computer program executed by a client computer).

Also, in the following description, the information may be described with respect to a "xxx management table," but the information may be implemented by any suitable data structure. Put differently, in order to indicate that the information does not depend on the data structure, "xxx management tables" may be described "xxx management information". Further, in the following description, one management table may be divided into two or more management tables, or entire or part of two or more management tables may be made one management table.

In the following description, tables related to management information may be referred to as "management tables," and DB tables may be simply referred to as "tables."

In the following description, numbers are used as element IDs (as identification information), but other types of IDs may be used in place of or in addition to the numbers.

In addition, in the following description, reference symbols (or shared symbols of the reference symbols) are used when describing elements of the same type without distinction, and element numbers (the numbers assigned to each element) (or reference symbols) are used to distinctly describe individual elements of the same type. Note that in the following description, the head of the element number is "0."

In the following description, I/O (Input/Output) requests may include read requests and write requests, and may be collectively referred to as access requests.

In addition, in the following description, there are cases where a "bbb unit" is used as a subject of the explanation, but as these functional parts can perform processing tasks executed by the processor using memory and communication ports (network I/F), the processor may be used instead as a subject of the explanation. Typically, the processor may include a microprocessor (for example, a CPU (Central Processing Unit)), and may also include dedicated hardware (for example, an ASIC (Application Specific Integrated Circuit) or a FPGA (Field-Programmable Gate Array). In addition, the processing disclosed with these functional units as subjects may be processing performed by a computer. Part or all of these functional units may be realized by dedicated hardware. Further, the various functional units may be installed in each computer by a program distribution server or a computer readable storage medium. Additionally, the various functional units and a server may be installed on one computer and executed, or may be installed and executed on a plurality of computers. The processor is an example of a control unit and may include a hardware circuit that performs part or all of the processing. The program may be installed from a program source into an apparatus such as a computer. The program source may be, for example, a program distribution server or a storage medium readable by a computer. In the case where the program source is a program distribution server, the program distribution server may include a processor (for example, a CPU) and a storage unit, and the storage unit may further store a distribution program and a distribution target program. Then, the processor of the program distribution server may distribute the distribution target program to other computers by executing the distribution program. In the following description, two or more programs may be realized as one program, or one program may be realized as two or more programs.

In the following description, "thread" may refer to an OS thread or a pseudo thread. OS threads are threads managed by an operating system (OS) (for example, threads managed by a kernel and a library) and can also be called real threads. In contrast, "pseudo threads" refer to threads managed by the DBMS. The DBMS may include a plurality of pseudo threads by subdividing OS threads.

In the following description, the "storage unit" may refer to one or more storage devices including a memory. For example, the storage unit may be a main memory device (typically volatile memory), or a main memory and an auxiliary memory device (typically a non-volatile storage device).

Also, in the following description, the database may include a table and an index. A "DB page" may be an example of a DB region. A "data page" may be an example of a data region. An "index page" may be an example of an index region. A "log file" may be an example of a log region. Each of these pages represents examples of logical regions.

Figure 2:
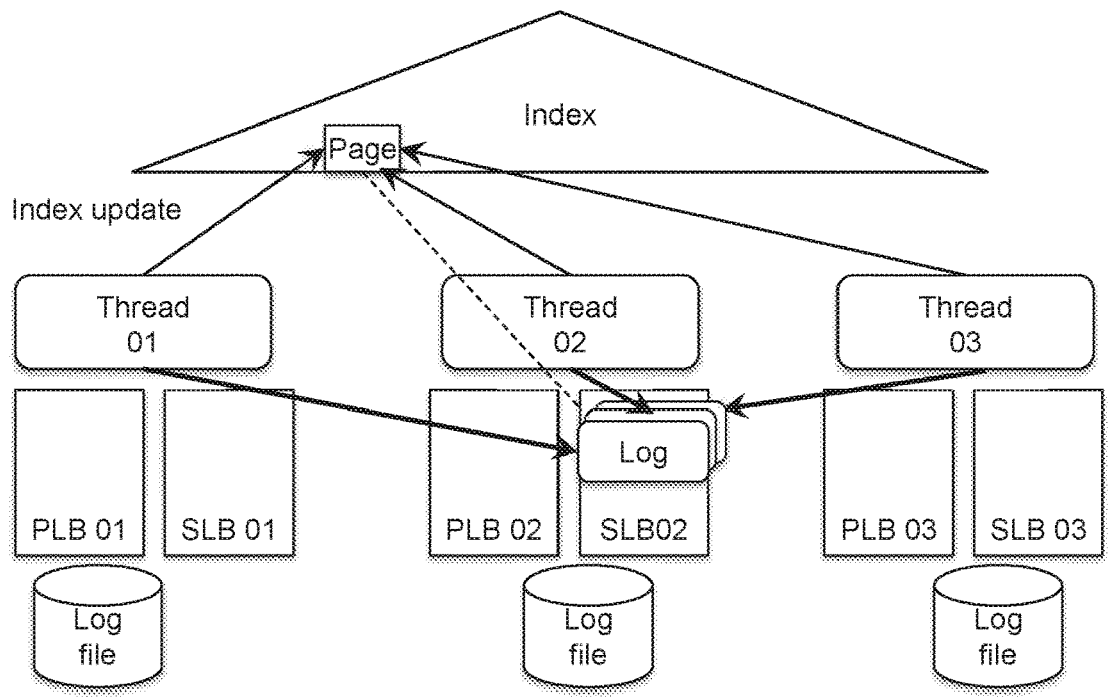
FIG. 2 is an explanatory diagram of an overview of an embodiment.

FIG. 2 is explanatory diagram of an overview of an embodiment.

A plurality (or one) of dedicated log buffers ("PLB" in the Figures) and a plurality (or one) of shared log buffers ("SLB" in the Figures) are prepared in the memory of the DB server. In the present embodiment, both a dedicated log buffer and a shared log buffer are prepared for each thread. The number of dedicated log buffers and shared log buffers allocated to one thread may be one or more. For all threads, the number of allocated dedicated log buffers need not be the same. Likewise, for all threads, the number of shared log buffers allocated need not be the same. In the present embodiment, one dedicated log buffer (for example, PLB 01) and one shared log buffer (for example, SLB 01) are allocated to one thread (for example, thread 01).

Each dedicated log buffer is a log buffer in which one or more logs of one thread to which the dedicated log buffer is allocated can exist, but in which two or more logs of two or more threads cannot coexist. In contrast, each shared log buffer is a log buffer in which two or more logs of two or more threads can coexist.

With respect to threads that update DB pages that cannot be updated by two or more threads of the plurality of DB pages, the DB server may select any of the dedicated log buffers as the log buffer to which a log relating to the update of DB page is to be written. In the present embodiment, the DB server may select a dedicated log buffer allocated to the thread.

In contrast, with respect to threads that update DB pages that can be updated by two or more threads of the plurality of DB pages, the DB server may select any of the shared log buffers as the log buffer to which a log relating to the update of DB is to be written. Accordingly, it is thus possible to reduce the number of times that the logs are written to the log file from the log buffer. Since two or more logs of two or more threads are aggregated into one shared log buffer, there are concerns that conflicts of the shared log buffer may occur (e.g., exclusive write access to the log file cannot be obtained). Even assuming a conflict were to occur, however, as it is a conflict for writing to the log buffer, the length of time that the write process is forced to wait is relatively short in comparison to the time it takes to wait for writing to the log buffer while the log is write to the log file from the log buffer. Put differently, the impact is relatively small.

In the present embodiment, with respect to threads that update DB pages that can be updated by two or more threads, the DB server uniquely selects the shared log buffer based on the update target DB page (for instance, the index page). Accordingly, if the update targets of two or more threads are the same DB page, the aggregate destination shared log buffers of the two or more threads are also the same. As such, the two or more threads both write to the shared log buffer.

Also, in the present embodiment, a plurality of log files may be allocated to each of a plurality of threads. Consequently, it is possible to avoid collision of one log file by two or more threads. It should be noted that the number of log files allocated to each thread need not be the same. In the present embodiment, one log file (for example, log file 01) may be allocated to one thread (for example, thread 01). Logs in the dedicated log buffer and the shared log buffer allocated to the thread are written to the log file allocated to the thread.

Further, in the present embodiment, any of threads may be allocated to each of a plurality of data pages. That is, one or more data pages may be allocated to one thread. One thread may be allocated to each data page. The thread may update a data page assigned to that thread, but may not update data pages that are not assigned to that thread. When two or more data pages are updated, the corresponding index pages may also be updated. This is because one or more index pages may be shared by two or more data pages. Therefore, in the present embodiment, "DB pages that cannot be updated by two or more threads" refer to data pages, and "DB pages that can be updated by two or more threads" refer to index pages. Accordingly, the update log of a data page may be written in a dedicated log buffer such that no conflict occurs in writing the update log of the data page to the log buffer. Note that assigning index pages to threads instead of or in addition to data pages is considered to be less significant than assigning data pages to threads. This is because one or more index pages may be shared between a plurality of data pages.

Also, in the present embodiment, each thread of the plurality of threads is a thread that can update both data pages and index pages. The DB server may determine whether an update target DB page is a data page or an index page. If the update target is a data page, the thread selects the dedicated log buffer allocated to the thread as the write destination of the update log of the data page. If the update target is an index page, the thread selects the shared log buffer uniquely specified by the index page as the write destination of the update log of the index page. In this way, even though the thread can update both data pages and index pages, it is possible to aggregate two or more logs of two or more threads into the shared log buffer.

Figure 3:
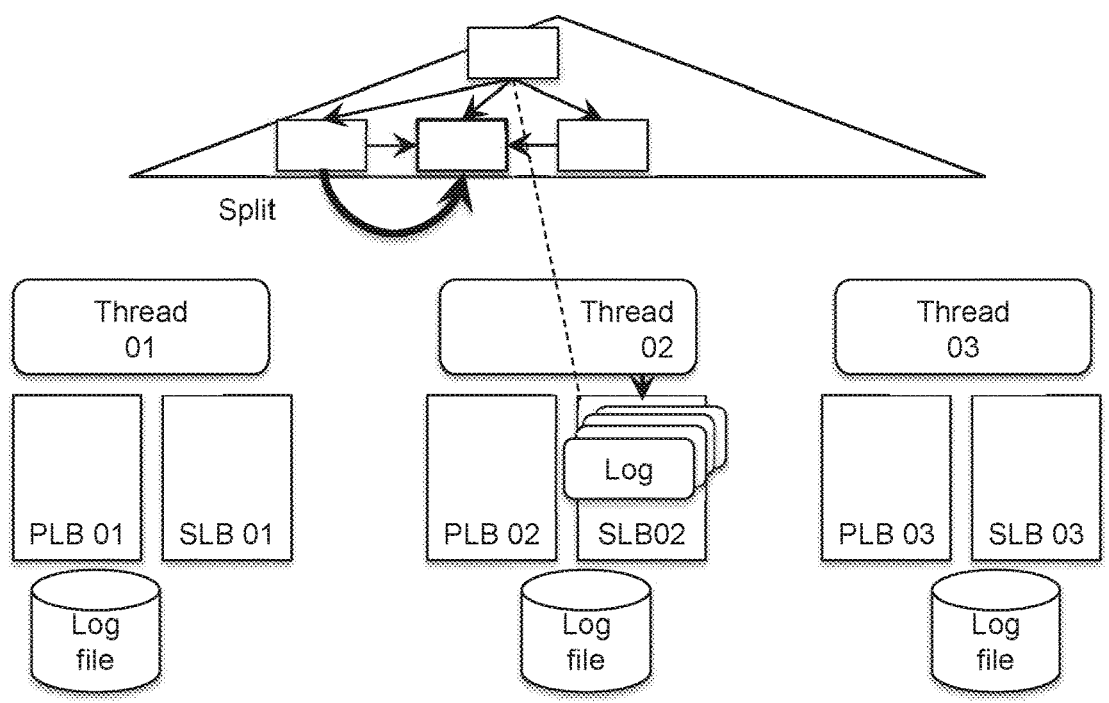
FIG. 3 is an explanatory diagram of an overview of index split processing.

Further, in the present embodiment, the index may be a B-tree structured index composed of a tree-structure index region. As designated in FIG. 3, when the index page is split (for example, when a new leaf page is added because of a shortage of openings in existing leaf index pages (hereinafter referred to as leaf pages)), the thread selects a shared log buffer uniquely specified from any one of the higher index pages connected to the leaf pages of all the update targets. A plurality of logs corresponding to all the update target leaf pages at the lower level of the upper index page are aggregated in the selected shared log buffer, and finally the plurality of logs are written in the same log file. Therefore, at the time of recovery (for example, when returning the split page to the original page), there is no need to match the logs between the log files.

Hereinafter, this embodiment will be described in detail.

Figure 4:
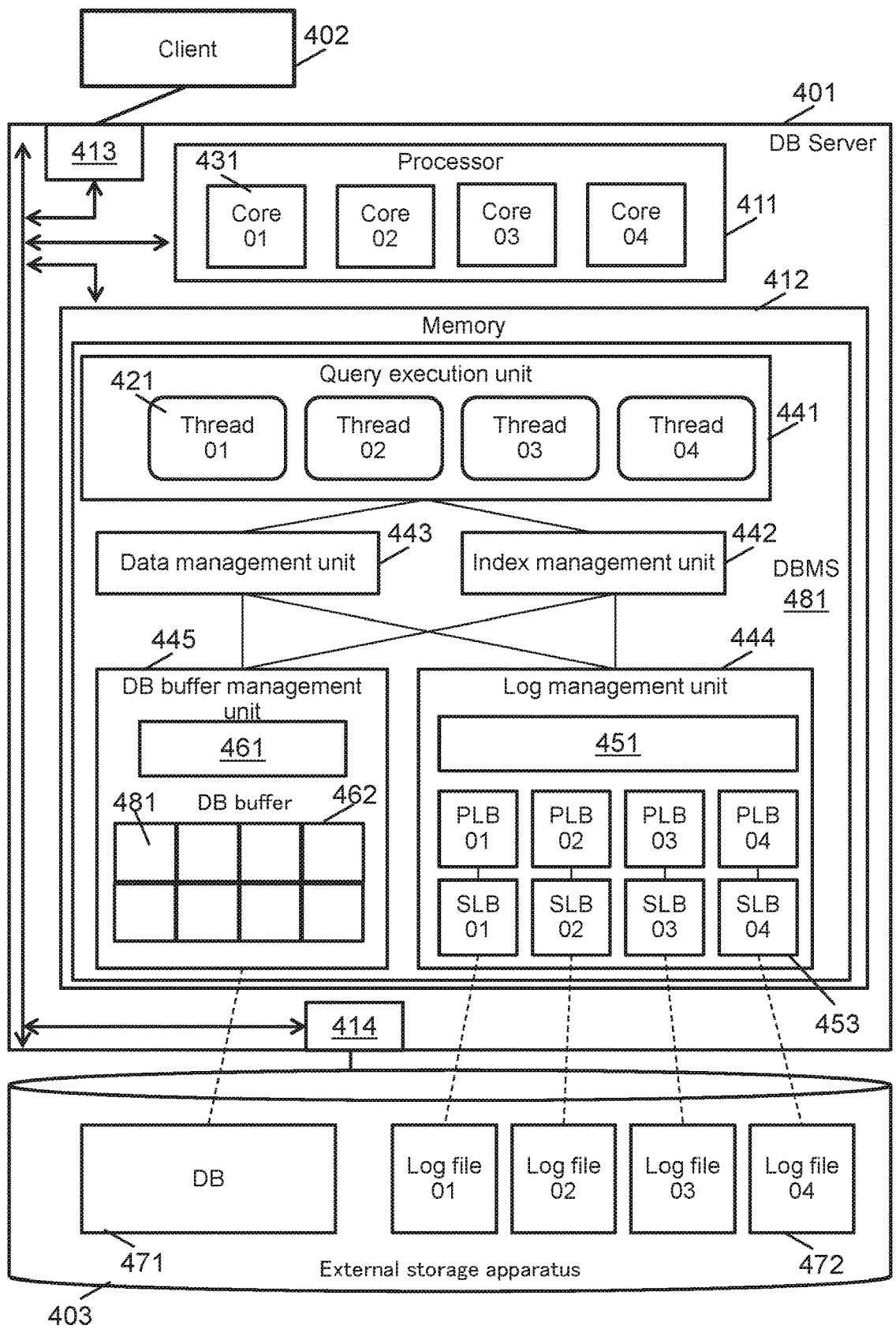
FIG. 4 is an example configuration of the entire system according to an embodiment.

FIG. 4 is an example configuration of the entire system according to an embodiment.

The DB server 401 is an example of a computer system and may, for example, be a personal computer, a workstation, or a mainframe; alternatively, it may be a virtual computer structured by a virtualization program on one of the above-mentioned computer. The DB server 401 may include a network adapter 413, a memory 412, a host bus adapter 414, and a processor 411 connected thereto. The network adapter 413 and the host bus adapter 414 are examples of interface devices. Communication with the client computer (hereinafter referred to as a client) 402 is performed via the network adapter 413 (typically, communication via a communication network). Communication with the external storage apparatus 403 is performed via the host bus adapter 414.

The processor 411 may, for example, be a microprocessor and execute computer programs. The computer programs executed by the processor 411 may, for instance, be an OS (Operating System) and the DBMS 481. The memory 412 is an example of a storage unit, and may temporarily store a program executed by the processor 411 as well as data used by the program. The processor 411 may have a plurality of cores 431. It is to be noted that the plurality of cores 431 may be configured to have a plurality of single core processors.

In the DB server 401, the DBMS 481 executes a query issued from a query issuing source such as the client 402, and in order to read data from the DB 471 or to write data in the DB 471 as part of the execution of the query, the DB 471 may issue an input/output request for the external storage apparatus 403 which stores the DB 471 to the OS. The OS may then accept the input/output request and issue an input/output request to the external storage apparatus 403. The query may be composed using, for instance, a structured query language (SQL).

The external storage apparatus 403 may be a storage apparatus including a plurality of storage devices or a single storage device. The external storage apparatus 402 stores the DB 471 managed by the DBMS 481, and it may also store one or more programs and log file 472 in addition to the data of the DB 471. The external storage apparatus 402 receives an input/output request from the DB server 401, reads and writes data in accordance with the input/output request, and returns the result to the DB server 401.

The DBMS 481 may manage the DB 471. The DB 471 may include one or more tables and one or more indexes. A table is a collection of one or more records, and a record consists of one or more columns. An index is a data structure created for one or more columns or the like of the table, and is configured to facilitate faster access to tables by a specified selection condition including columns targeted for the index. For example, the index is a data structure that maintains information for specifying, for each value of the target column, a record including that value in the table. The data structure may be configured using a B tree. Physical addresses, logical row IDs, or the like may be used as the information for specifying a record.

The DBMS 481 may include a query execution unit 441, a data management unit 443, an index management unit 442, a DB buffer management unit 445, and a log management unit 444.

The query execution unit 441 may accept a query, execute the query, and return the execution result to the query issuing source. The query execution unit 441 may include a plurality of threads 421, and each of the plurality of threads 421 may be executed by one of the cores 431. For example, each of threads 01 to 04 may be respectively executed by cores 01 to 04. Each thread 421 may perform data operations on data pages, data operations on index pages, and data operations on log files. However, each of the data threads that perform data operations on data pages, the index threads that perform data operations on index pages, and the log threads that perform data operations on log files may be independent of one another. Furthermore, for at least one of the data thread, the index thread, and the log thread, an update thread for performing update operations and a reference thread for performing reference operations may be independent. With regard to updating the table, each thread 421 may access the buffer page 481 in the DB buffer 462 managed by the buffer management unit 445 via the data management unit 443, as well as the log buffer 453 managed by the log management unit 444 via the data management unit 443. In addition, with regard to updating the index, each thread 421 may access the buffer page 481 in the DB buffer 462 managed by the buffer management unit 445 via the index management unit 442, and the log buffer 453 managed by the log management unit 444 via the index management unit 442.

The DB buffer management unit 445 manages a buffer page management table 461 and a DB buffer 462 for temporarily storing data of the DB 471. The DB buffer 462 is configured in the memory 412 and may include one or more buffer pages 481. The buffer page 481 is a DB page that exists in the DB buffer 462. The number of buffer pages 481 included in the DB buffer 462 may be limited to a predetermined value. The DB buffer management unit 445 reads the data of the DB 471 into the DB buffer 462 on a DB page-by-page basis, and writes the data stored in the DB buffer 462 into the DB 471 on a DB page-by-page basis. Upon receiving a data read request from the query execution unit 441, the DB buffer management unit 445 returns the data to the query execution unit 441 if the data targeted by the read request has already been stored in the DB buffer 462. In contrast, if the data targeted by the read request is not stored in the DB buffer 462, the DB buffer management unit 445 reads the data from the DB 471, stores the read data in the DB buffer 462, and subsequently returns the data to the query execution unit 441. The buffer page management table 461 may maintain information pertaining to each buffer page 481.

The log management unit 444 may include a log buffer selection unit 451 and manage a plurality of log buffers 453. In the present embodiment, as described above, a dedicated log buffer (PLB) and a shared log buffer (SLB) may be allocated to each thread 421. The log buffer selection unit 451 may select a log buffer as the write destination.

The configuration of the DBMS 481 designated in FIG. 1 is merely an example. For instance, one constituent element may be divided into a plurality of constituent elements, and a plurality of constituent elements may be integrated into one constituent element.

Figure 5:
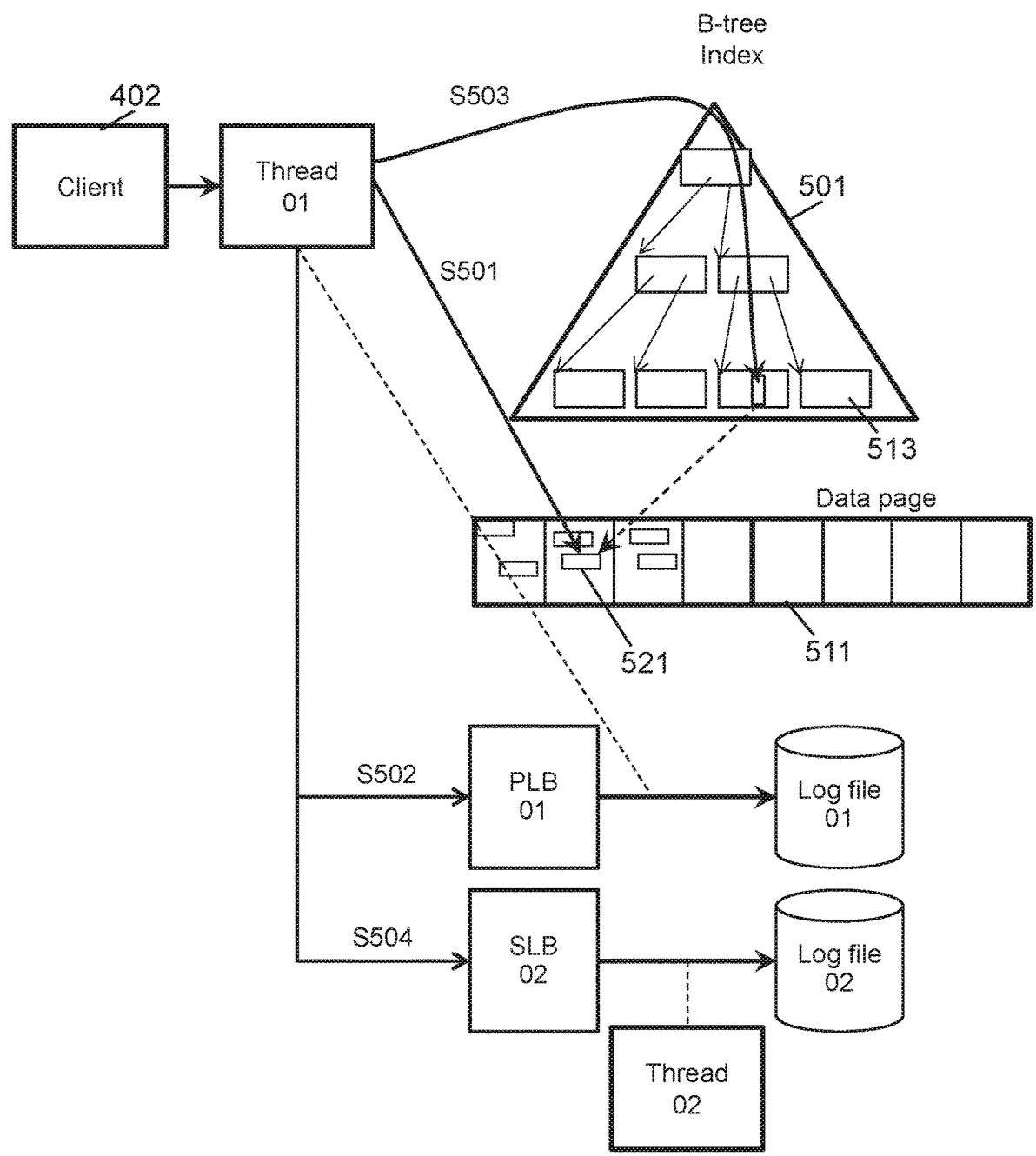
FIG. 5 is an explanatory diagram of a data update flow.

FIG. 5 is an explanatory diagram of a data update flow.

For example, as part of the execution of a query from the client 402, thread 01 may add a record 521 to one of the data pages 511 (buffer page 481) (S501). This is an example of a table update. Thread 01 may write the log of the table update to the dedicated log buffer 01 (S502). The logs in the dedicated log buffer 01 may be written to the log file 01 allocated to the thread 01.

The thread 01 may update the corresponding leaf page 513 of the index 501 according to the table update of S501 (S503). This is an example of an index update. Thread 01 may write the log of the index update into the shared log buffer 02 uniquely specified by the update target leaf page 513 (S504). The logs in the shared log buffer 02 may be written to the log file 02 allocated to the thread 02.

FIG. 6 is an example configuration of a buffer page management table 461.

The buffer page management table 461 maintains information such as a buffer page number 601, a status 602, a DB page number 603, a data type 604, and a storage state 605 for each buffer page 481.

The buffer page number 601 is the number of the buffer page 481.

The status 602 indicates the state of the buffer page 481. The status 602 may be "Clean" or "Dirty". "Clean" indicates that the buffer page corresponds with a DB page in the external storage apparatus 403. "Dirty" indicates that the buffer page does not match a DB page in the external storage apparatus 403 (that is, the updated buffer page has not been written to the external storage apparatus 403 as a DB page).

The DB page number 603 is the number of the DB page corresponding to the buffer page 481. The data type 604 indicates the page type of the buffer page 481. For instance, "data page" indicates that the buffer page 481 is a data page.

The storage state 605 indicates the storage state of the log buffer 453. "Y" indicates that there is a log which has not yet been written in the log file 472. When writing a "Dirty" buffer page 481 as a DB page, the DBMS 481 writes the logs of all the log buffers 453 whose storage state 605 is "Y" to the log file 472, and subsequently writes the "Dirty" buffer page 481 as a DB page. After the buffer page 481 is written as a DB page, the status 602 of the buffer page 481 is changed from "Dirty" to "Clean," and all the storage states 605 "Y" corresponding to the buffer page 481 are changed to "N."

Figure 7:
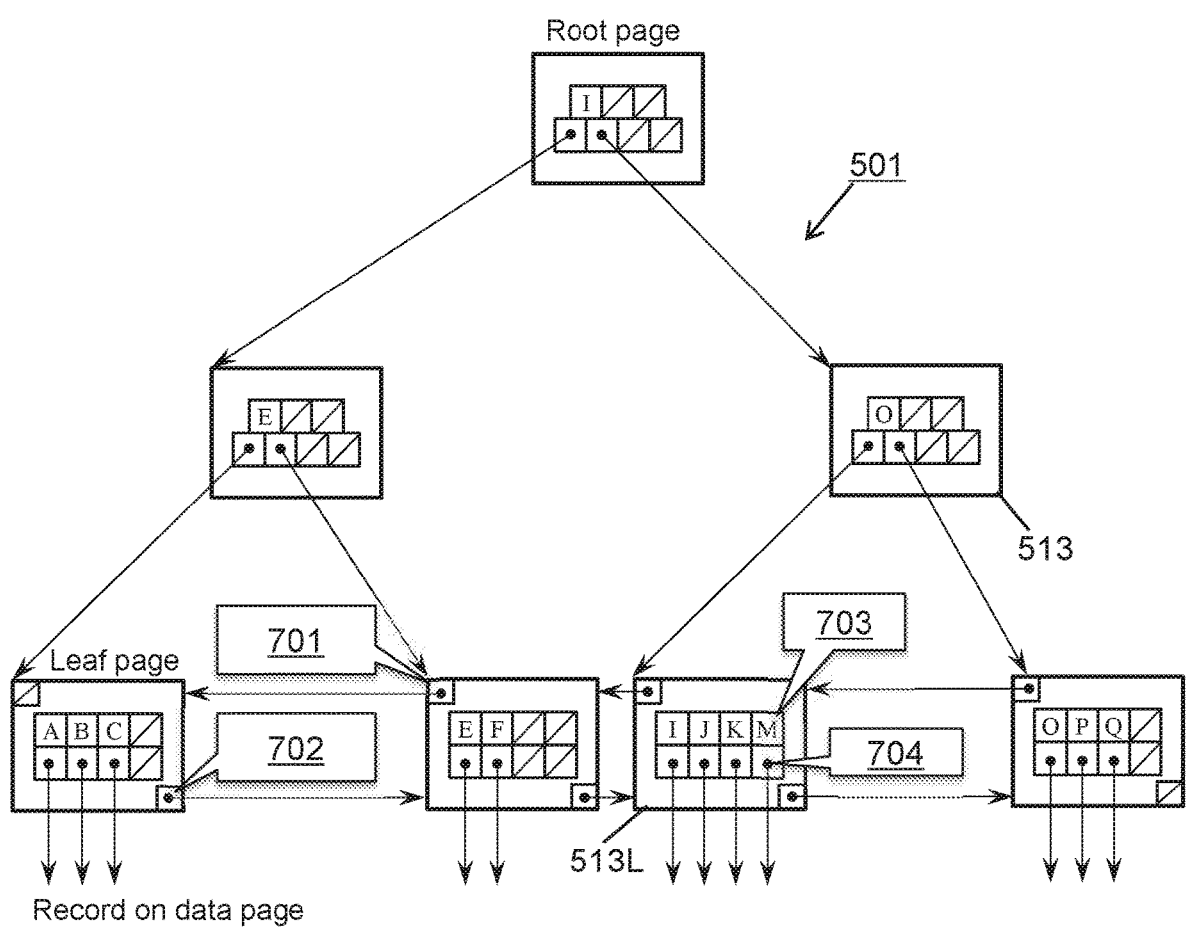
FIG. 7 is an example configuration of an index.

FIG. 7 is an example configuration of an index 501.

The index 501 is a B-tree index, and the plurality of index pages 513 are configured in a tree structure. The plurality of index pages 513 are composed of a plurality of leaf pages and one or more upper pages. The one or more upper pages may include at least a root page. A "leaf page" is a page that has no child page; that is, the lowest page in the tree structure. The "root page" is a page that has no parent node; that is, the top page in the tree structure. The upper pages other than the root page are intermediate page (which may also be called internal pages). The intermediate pages may include a parent page and at least one child page.

Links may exist between leaf pages. More particularly, each leaf page may include a pointer 701 to a left leaf page, a pointer 702 to a right leaf page, a key value 703, and a pointer (pointer to a record in the data page) 704 corresponding to the key value 703. The leaf page may include a plurality of key values 703, and pointers 704 corresponding to each of key values 703.

As illustrated in FIG. 7, as there is no vacancy in the leaf page 513L (e.g., the page is full), an entry (a set including a key value 703 and a pointer 704) cannot be added. In this state, if it is desired to add an entry to the leaf page 513L, an index split is performed.

Figure 8:
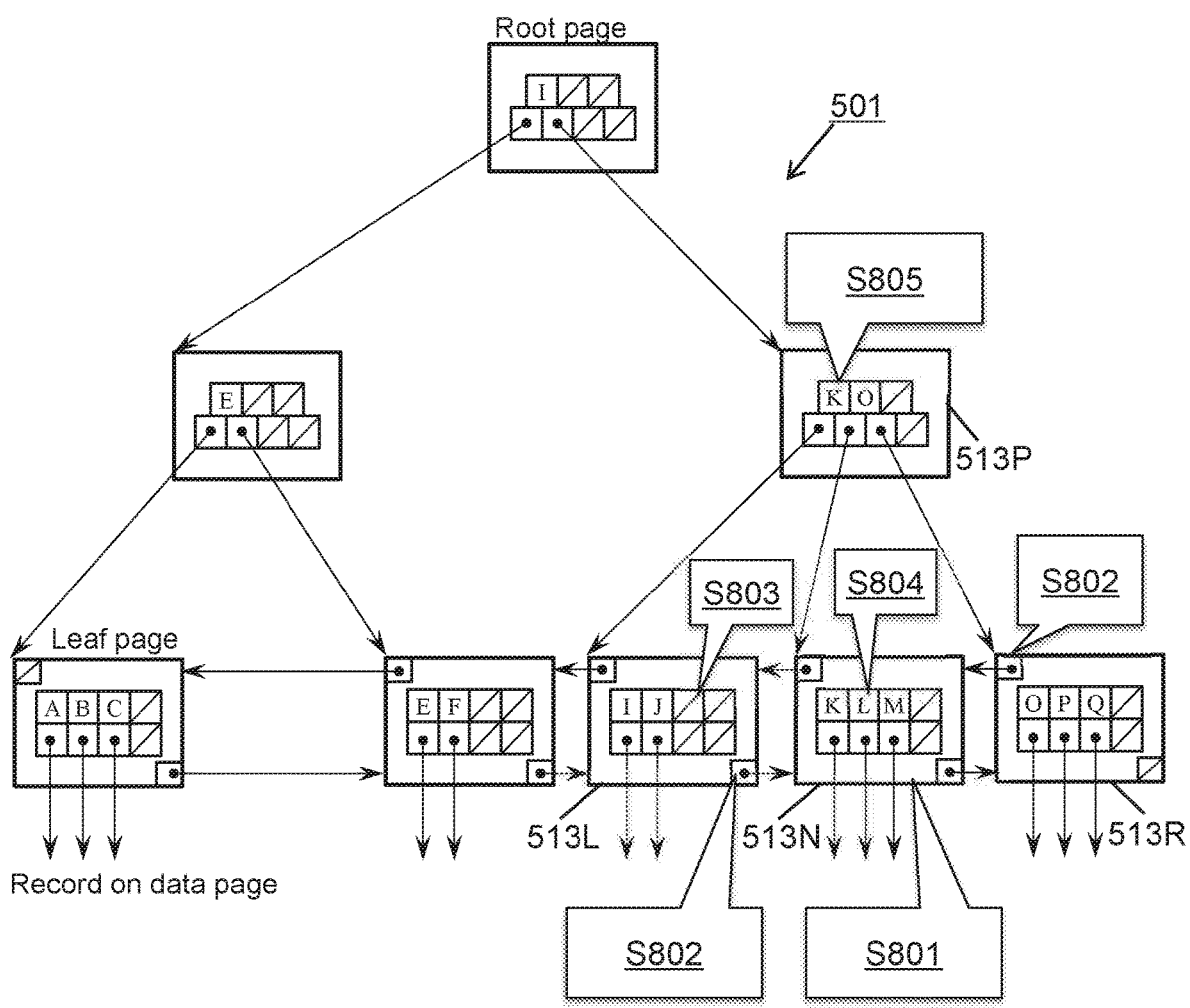
FIG. 8 is an explanatory diagram of an example of an index split.

FIG. 8 is an explanatory diagram of an example of an index split.

Generally, the index split refers to increasing the number of leaf pages; for example, one or more leaf pages may be divided. The index split may be executed, for example, when an entry needs to be added to a leaf page having no vacancy, or when the DBMS 481 receives instructions to perform an index split from the client 402 or the like. As illustrated in FIG. 8, an index split may be performed to add an entry including the key value "L" to a leaf page. In particular, the location to which the entry is to be added is the leaf page 513L as indicated by the arrangement of the key values, but as there is no vacancy in the leaf page 513L, index split is performed. The index split is performed by the DBMS 481 (for example, the index management unit 442).

The index management unit 442 may generate a new leaf page 513N (S801).

Next, the index management unit 442 updates the pointer of existing leaf pages to be associated with the new leaf page 513N to point to the new leaf page 513N (S802). In the example of FIG. 8, the pointer (pointer to the right leaf page) of the leaf page 513L on the left side of the new leaf page 513N and the pointer (pointer to the left leaf page) of the leaf page 513R on the right side of the new leaf page 513N are updated to point to the new leaf page 513N, respectively.

Next, the index management unit 442 moves a portion of the entries (for example, two right-side entries including the key values "K" and "M") of the leaf page 513L to the new leaf page 513N (S803). Then, the index management unit 442 inserts an entry including the key value "L" between the two entries moved to the new leaf page 513N (S804).

Finally, the index management unit 442 adds the entry indicating to the new leaf page 513N to the shared parent page 513P of leaf pages 513L, 513N, and 513R (S805).

According to the index split exemplified in FIG. 8, the update target index pages include the leaf pages 513L, 513N, and 513R, and the patent page 513P. In addition to the parent page 513P, the root page may also serve as a shared upper page (may also be called an ancestor page) of the update target leaf pages 513L, 513N, and 513R. In this embodiment, the lowest page (that is, the parent page 513P) among the shared upper pages of the update target leaf pages 513L, 513N, and 513R is the upper page described with reference to FIG. 3 (that is, the index page used to select the aggregate destination shared log buffers).

Figure 9:
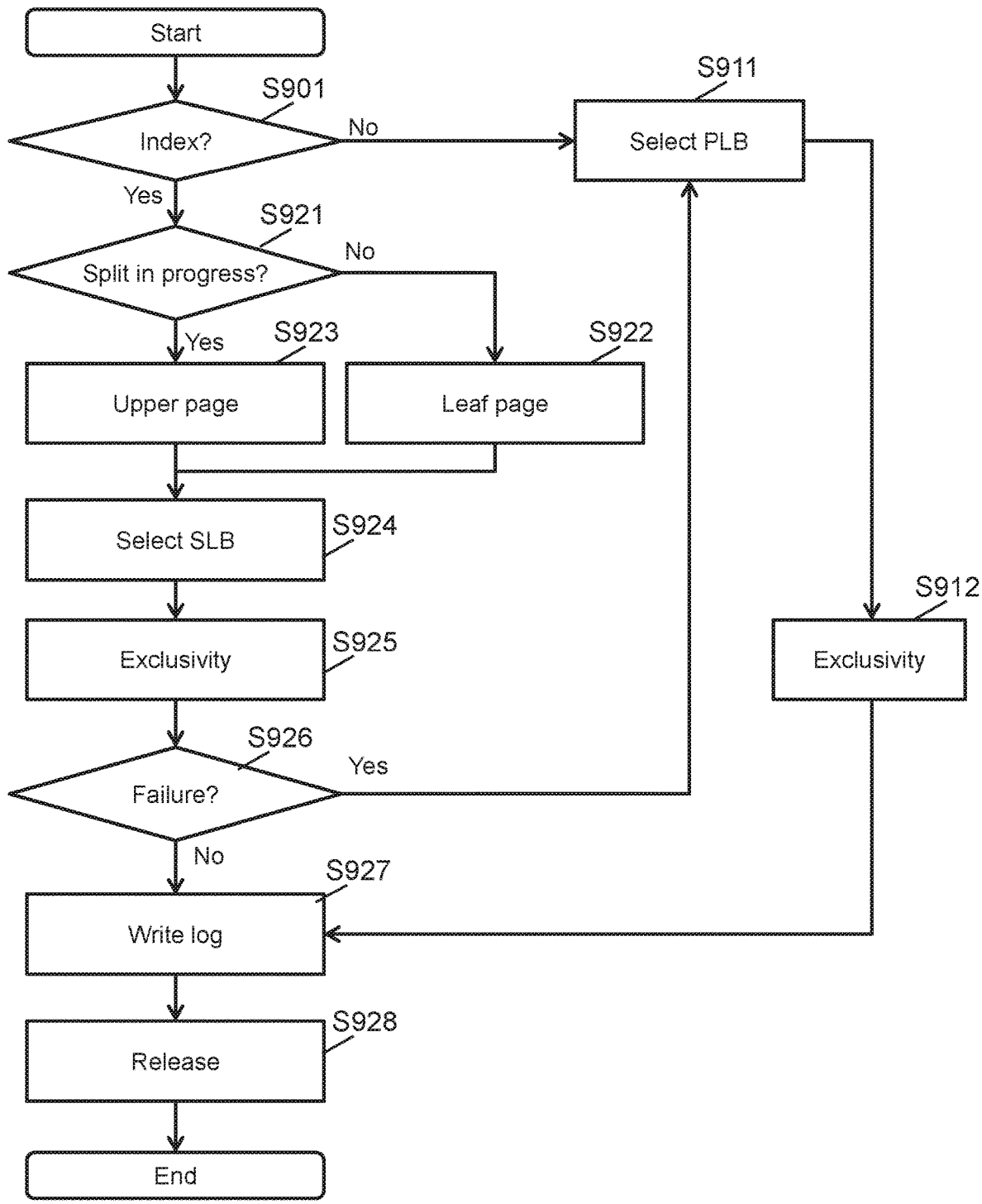
FIG. 9 is an example of the flow of log output processing.

FIG. 9 is an example of the flow of log output processing.

The log buffer selection unit 451 may determine whether or not the DB page to be updated by a thread (referred to as a "target thread" in the description of FIG. 9) is an index page (S901).

If the determination result in S901 is negative (S901: No), that is; if the update target DB page is a data page, the log buffer selection unit 451 selects the dedicated log buffer allocated to the target thread (S911). The target thread acquires exclusivity (a lock) of the dedicated log buffer selected in S911 (S912). Thereafter, the target thread writes the update log in the dedicated log buffer selected in S911 (S927) and releases the exclusivity of the dedicated log buffer (S928). With respect to the dedicated log buffer, acquisition and release of the exclusivity may be omitted.

If the determination result in S901 is positive (S901: Yes), that is; if the update target DB page is an index page, the log buffer selection unit 451 determines whether index split is in progress (S921). Whether or not index split is in progress can be identified, for example, by querying the index management unit 442.

If the determination result of S921 is negative (S921: No), the log buffer selection unit 451 selects a leaf page that is an update target index page as the index page to be used for selecting the aggregate destination shared log buffer (S922).

In contrast, if the determination result in S921 is positive (S921: Yes), the log buffer selection unit 451 selects the uppermost page among the update target index pages as the index page to be used for selecting the aggregate destination shared log buffer (S923). In S923, any upper page shared by all the update target leaf pages may be selected, but as described above, herein, the uppermost page of the index page to be updated is selected. Put differently, the lowest page among the upper pages shared by all the update target leaf pages is selected. This makes it possible to reduce the probability that same shared log buffer is selected as the aggregate destination shared log buffer.

After S922 or S923, the log buffer selection unit 451 selects one shared log buffer (S924). The shared log buffer may be selected randomly or by various other methods, but herein it is selected based on the index page selected in S922 or S923. Specifically, for example, the log buffer selection unit 451 may uniquely specify the shared log buffer using the shared log buffer number=Hash (p) mod N. Here, "p" is the number of the index page (target index page) selected in S922 or S923. "N" is the number of shared log buffers. "Hash (x)" is a hash function. The method by which the shared log buffer is uniquely selected from the number of the index page (target index page) selected in S922 or S923 is not limited to "shared log buffer number=Hash (p) mod N,".

The target thread may acquire exclusivity (a lock) of the shared log buffer selected in S924 (S925).

If acquisition of exclusivity is successful (S926: Yes), the target thread writes the update log to the shared log buffer selected in S924 (S927), and releases the exclusivity of the shared log buffer (S928).

In contrast, if acquisition of exclusivity fails (S926: No), the log buffer selection unit 451 selects the dedicated log buffer allocated to the target thread (S911). That is, when the shared log buffer selected in S924 conflicts with another thread, the update log is not aggregated in the shared log buffer but stored in the dedicated log buffer of the target thread. This makes it possible to avoid waiting for writing to the log buffer. In addition, if exclusivity acquisition fails, it may be possible to wait until exclusivity can be acquired instead of executing S911.

Although one embodiment has been described above, the present invention is not limited to this embodiment, and various modifications can be made without departing from the spirit of the invention. For example, at least a portion of the DB 471 may exist in the memory 412 of the DB server 401 (for example, in-memory may be utilized). Also, for example, at least one log files 472 may exist in the memory 412 in the DB server 401.

REFERENCE SIGNS LIST

401 DB Server

The invention claimed is:

1. A computer system for managing a database, the computer system comprising:
 a processor having a plurality of processor cores configured to execute a plurality of threads in parallel; and
 a storage unit having one or more data log buffers and one or more index log buffers;
 wherein the processor is configured to execute a plurality of threads that update a storage region including a data region and an index region in parallel,
 the threads are configured to update the data region and the index region relating to the data region and store logs relating to updates of the data region and the index region in a log buffer,
 the updates of the data region and the index region are performed after a log of another update relating to the data region and the index region is stored in a log file from the log buffer,
 the index region relates to a plurality of data regions, and
 the index region includes an index log buffer that stores the log relating to the update of the index region, wherein the index log buffer is determined based on a page of the log file in which the index log buffer is to be stored, and a data log buffer that stores the log relating to the update of the data region, wherein the data log buffer is determined based on a thread which generates the log by updating the data region, and
 in a case in which a target of the update is a data page, the thread selects a dedicated log buffer allocated to the thread as a write destination of the update log of the data page, and in a case in which the target of the update is an index page, the thread selects a shared log buffer uniquely specified by the index page as a write destination of the update log of the index page.

2. The computer system according to claim 1, wherein:
 each index log buffer of a plurality of index log buffers is allocated to a thread of the plurality of threads; and
 the processor is configured to select one of the plurality of index log buffers.

3. The computer system according to claim 2, wherein:
 the database includes a table and an index;
 a plurality of database regions associated with the database includes a plurality of data regions and a plurality of index regions;
 each data region of the plurality of data regions is a database region including data for a table;
 each index region of the plurality of index regions is a database region including data for the index; and
 the index region is a database region that can be updated by two or more threads.

4. The computer system according to claim 3, wherein:
 the index log buffer is selected based on an update target index region.

5. The computer system according to claim 4, wherein:
 the index is a B-tree structured index composed of a tree-structured index region; and
 in case that a split is performed with the index, the index log buffer is selected based on an upper index region connected to all of update target leaf index regions.

6. The computer system according to claim 5, wherein:
 the upper index region is an uppermost index region among all update target index regions.

7. The computer system according to claim 4, wherein:
 the index log buffer is uniquely specified using a number of a target index region and a number of index log buffers.

8. The computer system according to claim 3, wherein:
 a plurality of log regions are allocated to the plurality of threads; and
 each thread of the plurality of threads writes logs in the data log buffer and the index log buffer allocated to the thread to a log region allocated to the threads.

9. The computer system according to claim 3, wherein:
 a thread is allocated to each of the plurality of data regions; and
 a thread to which at least one data region is allocated is able to update the at least one data region allocated to it, but is unable to update a data region not allocated to it; and
 each index region of the plurality of index regions is able to be updated by two or more threads.

10. The computer system according to claim 9, wherein:
 each thread of the plurality of threads can update the data region and the index region; and
 wherein the processor is configured to:
 determine whether an update target database region is the index region;
 execute, in a case that the update target database region is not the index region, selecting, for a thread that updates one of a plurality of database regions associated with the database and that cannot be updated by two or more threads, a data log buffer as a log buffer to which a log relating to an update of the database region is to be written; and
 execute, in a case that the update target database region is the index region, selecting, for a thread that updates a database region that is among the plurality of database regions and that can be updated by two or more threads, an index log buffer as a log buffer to which a log relating to an update of the database region is to be written.

11. The computer system according to claim 10, wherein:
 the processor is configured to acquire exclusivity of the selected index log buffer and subsequently write a log to the selected index log buffer in the case that the update target database region is the index region; and
 the processor is configured to write a log in a data log buffer corresponding to the thread when the processor cannot acquire exclusivity of the selected index log buffer in the case that the update target database region is the index region.

12. The computer system according to claim 1, comprising
 a plurality of the data log buffers and index log buffers, wherein the log of the update of the index region is stored in the index log buffer associated with the index region.

13. The computer system according to claim 12, comprising
the data log buffer and the index log buffer for each thread,
wherein the log of the update of the data region is stored in the data log buffer of the thread that has performed the update, and
a log to be stored in the index log buffer is an update to the index region associated with the index log buffer and is a log relating to an update that has been performed by one's own thread and another thread.

14. The computer system according to claim 1,
wherein when the thread updates the storage region, after a log of the data log buffer of the thread and the index log buffer associated with the index region to be updated is stored in the log file, the update of the storage region is performed.

15. A method for managing a database in a computer system that includes a processor having a plurality of processor cores configured to execute a plurality of threads in parallel and a storage unit having one or more data log buffers and one or more index log buffers, the method comprising:
executing a plurality of threads that update a storage region including a data region and an index region in parallel;
updating the data region and the index region relating to the data region and storing logs relating to updates of the data region and the index region in a log buffer,
performing the updates of the data region and the index region after a log of another update relating to the data region and the index region is stored in a log file from the log buffer, wherein the index region relates to a plurality of data regions, and
storing, in an index log buffer of the index region, the log relating to the update of the index region, wherein the index log buffer is determined based on a page of the log file in which the index log buffer is to be stored, and storing, in a data log buffer, the log relating to the update of the data region, wherein the data log buffer is determined based on a thread which generates the log by updating the data region, and
wherein in a case in which a target of the update is a data page, the thread selects a dedicated log buffer allocated to the thread as a write destination of the update log of the data page, and in a case in which the target of the update is an index page, the thread selects a shared log buffer uniquely specified by the index page as a write destination of the update log of the index page.

\* \* \* \* \*